United States Patent
Peiris et al.

(10) Patent No.: US 8,565,112 B2
(45) Date of Patent: Oct. 22, 2013

(54) CONCURRENT TRANSMISSION OF WI-FI AND BLUETOOTH SIGNALS

(75) Inventors: Bemini Hennadige Janath Peiris, San Jose, CA (US); Sundar Sankaran, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/094,090

(22) Filed: Apr. 26, 2011

(65) Prior Publication Data
US 2012/0275319 A1 Nov. 1, 2012

(51) Int. Cl.
*G01R 31/08* (2006.01)

(52) U.S. Cl.
USPC .......................................... 370/252; 370/339

(58) Field of Classification Search
USPC .......... 370/252, 328, 329, 338, 339, 401, 465
See application file for complete search history.

(56) References Cited

U.S. PATENT DOCUMENTS

| | | | |
|---|---|---|---|
| 7,489,910 B2 * | 2/2009 | Kato et al. | 455/101 |
| 8,223,693 B2 * | 7/2012 | Ko et al. | 370/328 |
| 8,249,031 B1 * | 8/2012 | Hirsch et al. | 370/336 |
| 8,364,080 B2 * | 1/2013 | Desai et al. | 455/41.2 |
| 2001/0051530 A1 | 12/2001 | Shiotsu et al. | |
| 2007/0004336 A1 | 1/2007 | Aloni Lavi et al. | |
| 2008/0137566 A1 * | 6/2008 | Marholev et al. | 370/310 |
| 2012/0236735 A1 * | 9/2012 | Nory et al. | 370/252 |

OTHER PUBLICATIONS

International Search Report and Written Opinion—PCT/US2011/034503—ISA/EPO—Nov. 8, 2011.

* cited by examiner

*Primary Examiner* — Ricky Ngo
*Assistant Examiner* — Christine Ng
(74) *Attorney, Agent, or Firm* — Mahamedi Paradice Kreisman LLP

(57) ABSTRACT

A method and device for concurrently transmitting a Wi-Fi signal and a Bluetooth signal via a common power amplifier and antenna. A first set of values indicative of transmission power levels of a Wi-Fi signal and a corresponding set of values indicative of transmission power levels of a BT signal are stored in a table. Information about activities pertaining to the BT signal including a value of a transmission power level of the BT signal is received. Based on the received value of the transmission power level of the BT signal, a corresponding value of a transmission power level of the Wi-Fi signal may be looked up from the table. Transmission of one or more of the Wi-Fi or BT signals may be controlled, based on at least one of the received information or the looked-up value of the transmission power level of the Wi-Fi signal.

16 Claims, 7 Drawing Sheets

CONCURRENT TRANSMISSION OF WI-FI AND BLUETOOTH SIGNALS

TECHNICAL FIELD

The present embodiments relate generally to communication systems, and specifically to the concurrent transmission of Wi-Fi and Bluetooth signals using a single antenna.

BACKGROUND OF RELATED ART

Many wireless devices are capable of wireless communication with other devices using both wireless local area network (WLAN) signals and Bluetooth (BT) signals. For example, many laptops, netbook computers, and tablet devices use WLAN signals (also commonly referred to as Wi-Fi signals) to wirelessly connect to networks such as the Internet and/or private networks, and use Bluetooth signals to communicate with local BT-enabled devices such as headsets, printers, scanners, and the like. Wi-Fi communications are governed by the IEEE 802.11 family of standards, and Bluetooth communications are governed by the IEEE 802.15 family of standards.

To concurrently transmit both Wi-Fi signals and Bluetooth signals (e.g., to transmit information to the network via Wi-Fi signals while transmitting audio information to a BT-enabled headset), wireless devices typically use a first external antenna and a first associated power amplifier for the transmission of the Wi-Fi signals, and use a second external antenna and a second associated power amplifier for the transmission of the Bluetooth signals. Separate power amplifiers and antennas are typically used for the transmission of Wi-Fi signals and Bluetooth signals because of difficulties associated with concurrently transmitting Wi-Fi signals and Bluetooth signals using the same power amplifier. More specifically, conventional attempts to concurrently process Wi-Fi and Bluetooth signals in the same power amplifier typically cause the power amplifier to operate in a non-linear manner that can lead to the generation of undesirable out-of-band spectral components (e.g., intermodulation products) that violate FCC out-of-band emission limits.

Thus, although faster wireless connections to the network can be achieved by employing a second Wi-Fi channel, another antenna and associated power amplifier are typically required to accommodate the additional Wi-Fi channel. Unfortunately, because many wireless devices such as laptops include only two external antennas and associated power amplifiers, the use of two Wi-Fi channels in such wireless devices typically precludes the concurrent use of Bluetooth signals, which is undesirable. Thus, there is a need to enable the concurrent transmission of multiple Wi-Fi channels and one or more Bluetooth signals using only two pairs of antennas and power amplifiers in a manner that does not cause unacceptable signal distortion and that does not violate FCC out-of-band emission limits.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

The present embodiments are discussed below in the context of concurrently transmitting Wi-Fi signals and Bluetooth signals via a single power amplifier and antenna for simplicity only. It is to be understood that the present embodiments are equally applicable for concurrently transmitting multiple signals of other various wireless standards or protocols using a single power amplifier and antenna. In the following description, numerous specific details are set forth such as examples of specific components, circuits, software and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components.

Figure 1:
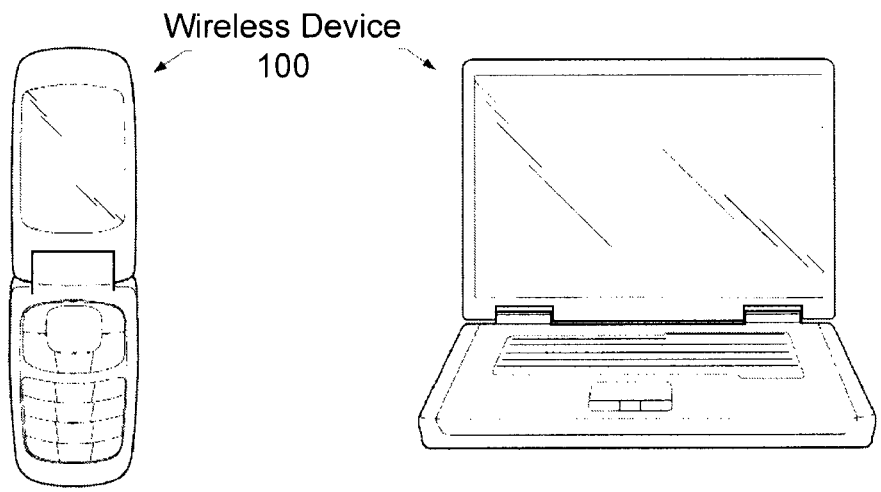
FIG. 1 depicts wireless devices within which the present embodiments can be implemented.

FIG. 1 shows wireless devices 100 such as a laptop and a cellular phone that can be configured to concurrently transmit Wi-Fi and Bluetooth signals using a single antenna and power amplifier in accordance with some embodiments. Although not shown for simplicity, the wireless devices 100 can include other devices such as a tablet computer, a desktop computer, PDAs, and so on. For some embodiments, wireless devices 100 can use Wi-Fi signals to exchange data with the Internet, LAN, WLAN, and/or VPN, and can use Bluetooth signals to exchange data with local BT-enabled devices such as headsets, printers, scanners, and so on.

Figure 2:
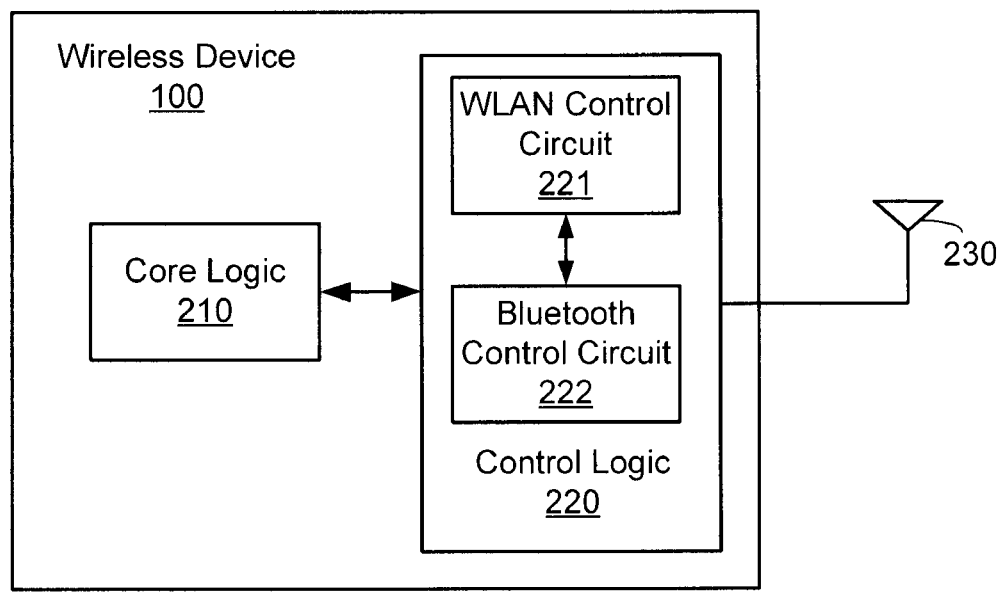
FIG. 2 is a high-level block diagram of a wireless device capable of concurrently transmitting Wi-Fi and Bluetooth signals in accordance with some embodiments.

FIG. 2 is a high-level functional block diagram of the wireless device 100 shown to include core logic 210, transceiver control logic 220, and one or more external antennas 230. The core logic 210, which can include well-known elements such as processors and memory elements, performs general data generation and processing functions for the wireless device 100. The transceiver control logic 220 includes a WLAN control circuit 221 and a Bluetooth control circuit 222, and is coupled to core logic 210 and to external antenna (s) 230. The WLAN control circuit 221 is configured to control the transmission and reception of Wi-Fi signals for device 100. The Bluetooth control circuit 222 is configured to control the transmission and reception of Bluetooth signals for device 100. The various components (not shown for simplicity) within core logic 210, WLAN control circuit 221, and/or Bluetooth control circuit 222 can be implemented in a variety of ways including, for example, using analog logic, digital logic, processors (e.g., CPUs, DSPs, microcontrollers, and so on), application specific integrated circuits (ASICs), field programmable gate arrays (FPGAs), or any combination of the above. Further, although shown in FIG. 2 as separate components, the WLAN control circuit 221 and the Bluetooth control circuit 222 can be implemented on the same integrated circuit (IC) chip. For other embodiments, the core logic 210, the WLAN control circuit 221, and the Bluetooth control circuit 222 can be all implemented on the same IC chip.

Figure 3:
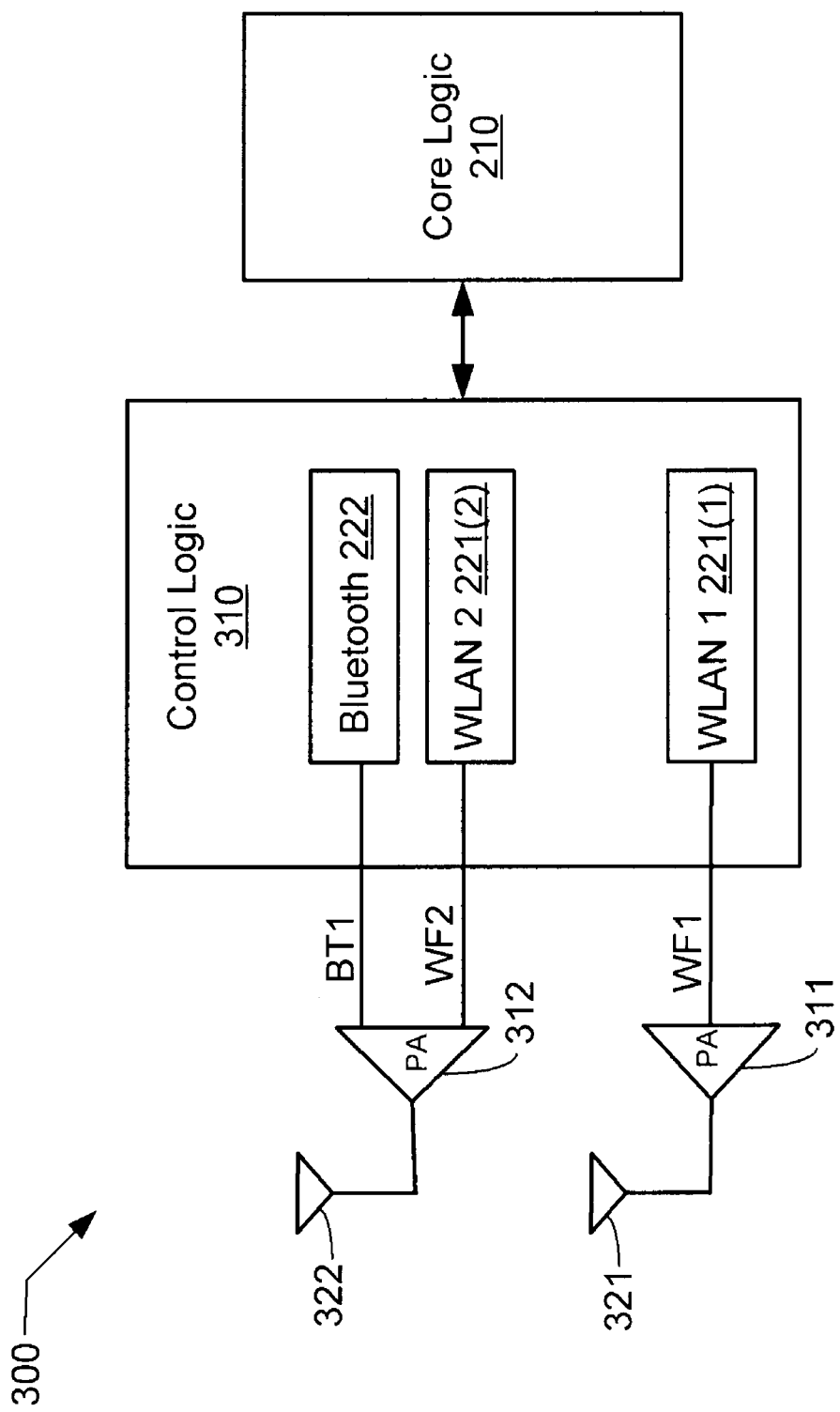
FIG. 3 is a block diagram of one embodiment of the wireless device of FIG. 2.

FIG. 3 shows a wireless device 300 that is one embodiment of device 100 of FIG. 2. The wireless device 300 includes transceiver control logic 310, a first power amplifier 311, a second power amplifier 312, a first external antenna 321, and a second external antenna 322. The power amplifiers 311-312 and the antennas 321-322 are well-known. The transceiver control logic 310, which is one embodiment of transceiver control logic 220 of FIG. 2, is shown to include a first WLAN control circuit 221(1), a second WLAN control circuit 221(2), and the Bluetooth control circuit 222. Transceiver control logic 310 is also shown coupled to the core logic 210. The first WLAN control circuit 221(1) is coupled to the first power amplifier 311, which in turn is coupled to the first antenna 321. The second WLAN control circuit 221(2) and the Bluetooth control circuit 222 are both coupled to the second power amplifier 312, which in turn is coupled to the second antenna 322.

During normal transmission operations of device 300, the core logic 210 provides data for transmission according to the Wi-Fi protocol to the WLAN1 and WLAN2 control circuits 221, and provides data for transmission according to the Bluetooth protocol to the Bluetooth control circuit 222. More specifically, in response to data received from the core logic 210, the first WLAN control circuit 221(1) generates a first Wi-Fi signal (WF1) that is amplified by the first power amplifier 311 and subsequently broadcast by the first antenna 321 (e.g., according to well-known Wi-Fi protocols). Similarly, the second WLAN control circuit 221(2) generates a second Wi-Fi signal (WF2) that is amplified by the second power amplifier 312 and subsequently broadcast by the second antenna 322 (e.g., according to well-known Wi-Fi protocols). For other embodiments, the first and second Wi-Fi signals WF1 and WF2 can be generated by the same WLAN control circuit. The Bluetooth control circuit 222 generates a Bluetooth signal (BT1) that is amplified by the second power amplifier 312 and subsequently broadcast by the second antenna 322 (e.g., according to well-known Bluetooth protocols). Thus, in accordance with the present embodiments, device 300 is able to concurrently process the Wi-Fi signal WF2 and the Bluetooth signal BT1 using the same power amplifier 312, and can subsequently broadcast the amplified Wi-Fi and Bluetooth signals via the same antenna 322, as described in more detail below.

For exemplary embodiments described herein, the transmission power level of Wi-Fi signals WF1 and WF2 can vary approximately between 8 dBm and 18 dBm, and the transmission power level of the Bluetooth signal BT1 can vary approximately between −20 dBm to 4 dBm. Of course, for other embodiments, other power levels for the Wi-Fi and Bluetooth signals can be used.

Power amplifiers such as power amplifiers 311 and 312 of FIG. 3 typically operate in a linear manner as long as the input voltage of the power amplifier remains below a threshold voltage specific to the power amplifier. More specifically, when operating in the linear region, the power amplifier exhibits a linear transfer function such that the amplitude of the output signal is proportional to the amplitude of the input signal, thereby providing a relatively constant gain for various values of the input signal. However, if the amplifier input voltage increases beyond the threshold voltage, the transfer function of the power amplifier becomes non-linear and begins to level off, thereby decreasing the amplifier gain as the input voltage increases beyond the threshold voltage.

Figure 4A:
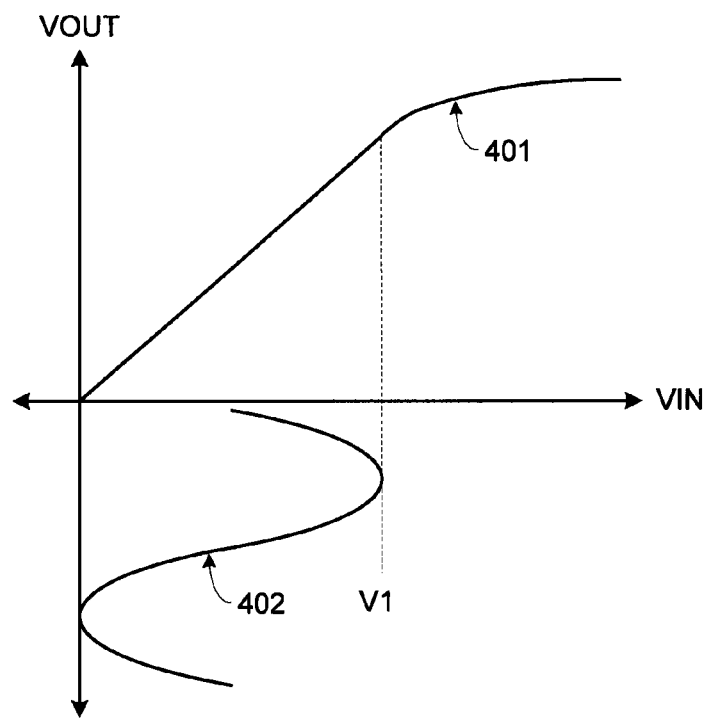
FIG. 4A is a graph depicting an illustrative transfer function of a power amplifier of FIG. 3 relative to an input signal consisting of a Wi-Fi signal.

For example, FIG. 4A depicts an illustrative transfer function 401 of power amplifier 312 relative to an input signal 402. The transfer function 401 is linear (e.g., has a relatively constant slope) for input voltages that are less than a threshold voltage V1 associated with the power amplifier 312. As depicted in FIG. 4A, the amplitude of the input signal 402, which is representative of the Wi-Fi signal WF2 processed by power amplifier 312, is less than the threshold voltage V1, and therefore power amplifier 312 can typically process input signal 402 in a linear manner.

Figure 4B:
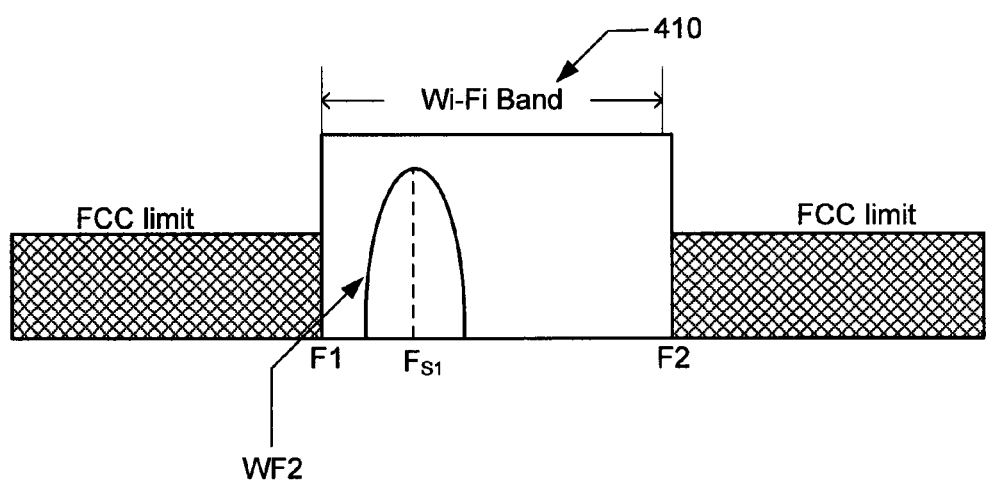
FIG. 4B is a graph depicting the Wi-Fi signal of FIG. 4A in the frequency domain.

FIG. 4B is a graph depicting the Wi-Fi signal WF2 (e.g., corresponding to input signal 402 of FIG. 4A) in the frequency domain relative to the Wi-Fi frequency band 410. The Wi-Fi frequency band 410 is shown to extend between a lower frequency F1 of approximately 2400 MHz and a higher frequency F2 of approximately 2480 MHz, in accordance with current WLAN transmission standards. The exemplary Wi-Fi signal 402 is shown in FIG. 4B as being centered at a frequency $F_{S1} \approx 2410$ MHz. Because the amplitude of the input signal 402 remains below the threshold voltage of the power amplifier 312 (as depicted in FIG. 4A), the power amplifier 312 operates in a linear manner and undesirable out-of-band frequency signals are negligible.

As mentioned above, concurrently transmitting a Wi-Fi signal and a Bluetooth signal using the same power amplifier and antenna can be problematic because of the generation of undesirable out-of-band spectral components that can violate FCC power limits in the wireless frequency spectrum. More specifically, when the Wi-Fi signal WF2 and the Bluetooth signal BT1 are concurrently processed by the same power amplifier 312, the combined amplitudes of the two signals WF2 and BT1 may exceed the threshold voltage V1 of the power amplifier 312, which in turn can cause the power amplifier 312 to undesirably operate in a non-linear manner.

Figure 5A:
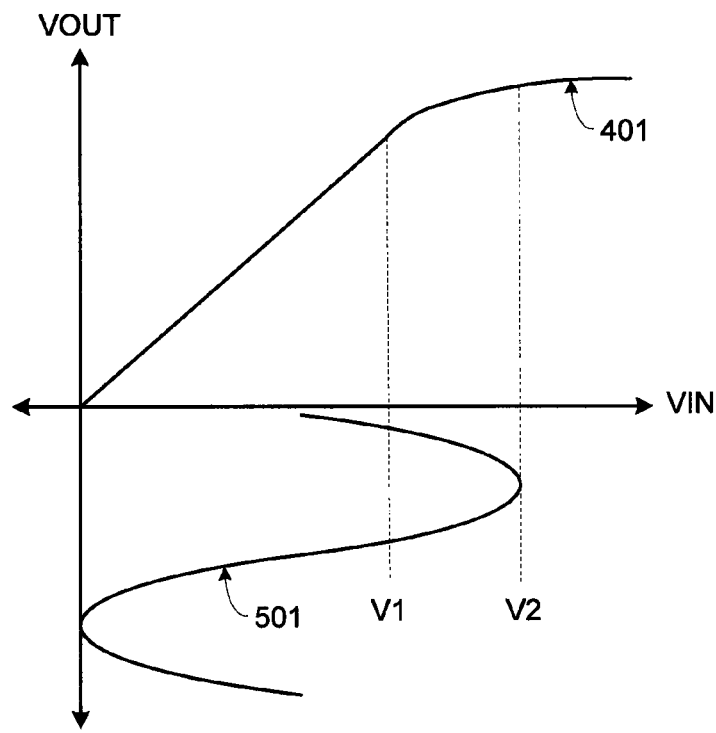
FIG. 5A is a graph depicting the transfer function of the power amplifier of FIG. 3 relative to an input signal including a Wi-Fi signal and a Bluetooth signal.

For example, FIG. 5A depicts the transfer function 401 of power amplifier 312 and an input signal 501 that includes the Wi-Fi signal WF2 and the Bluetooth signal BT1. As depicted in FIG. 5A, the amplitude of the input signal 501 is equal to a voltage V2 that is greater than the threshold voltage V1 of the power amplifier 312, and therefore can cause power amplifier 312 to undesirably operate in a non-linear manner.

The non-linear characteristics of the power amplifier 312 can be modeled as an odd-order polynomial using a number of parameters including, for example, the 1 dB compression point and the third-order intercept point. The 1 dB compression point is defined as the point on the power amplifier's transfer function at which output signal power drops by 1 dBm from the corresponding linear value. The third-order intercept point relates non-linear products caused by the third-order nonlinear terms to the linearly amplified signal. Together, the 1 dB compression point and the third-order intercept point can be used to determine the point at which the transfer function of the power amplifier becomes non-linear (e.g., and thus can be used to determine the threshold voltage V1 of the power amplifier 312). A rule of thumb that holds for many RF amplifiers is that the 1 dB compression point falls approximately 10 dB below the third-order intercept point.

Figure 5B:
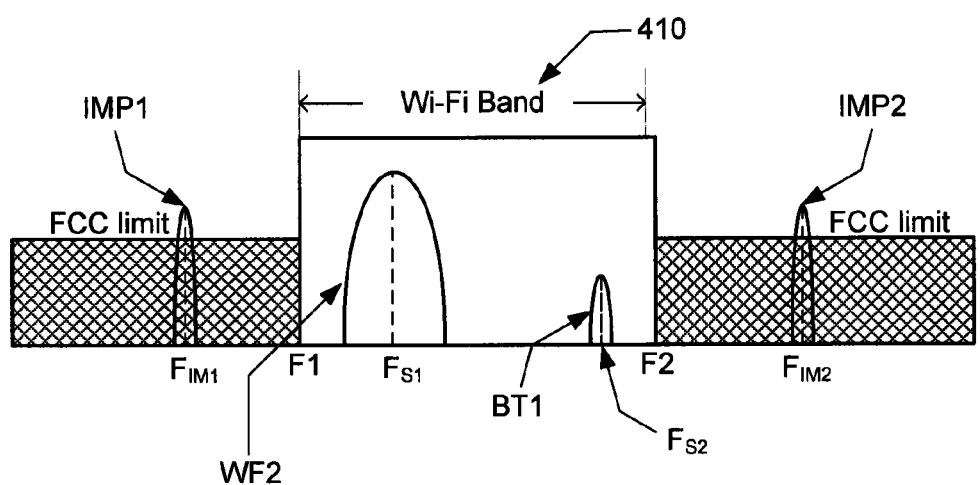
FIG. 5B is a graph depicting the Wi-Fi and Bluetooth signals of FIG. 5A in the frequency domain relative to exemplary inter-modulation product (IMP) components generated by the power amplifier of FIG. 3 during concurrent processing of the Wi-Fi and Bluetooth signals.

FIG. 5B is a graph depicting the Wi-Fi signal WF2 and the Bluetooth signal BT1 in the frequency domain relative to the Wi-Fi frequency band 410. The exemplary Wi-Fi signal WF2 is depicted in FIG. 5B as being centered at frequency $F_{S1} \approx 2410$ MHz, and the exemplary Bluetooth signal BT1 is depicted in FIG. 5B as being centered at a frequency $F_{S2}$ 2460 MHz. Also shown in FIG. 5B are unwanted inter-modulation product (IMP) signals IMP1 and IMP2 created at frequencies of $F_{IM1}$ and $F_{IM2}$ that lie outside the Wi-Fi band 410 and have power levels that violate FCC limits on out-of-band signal power, as depicted in FIG. 5B. The relationship between the frequencies of $F_{IM1}$ and $F_{IM2}$ are as follows:

$$F_{IM1} = 2 * F_{IM1} - F_{IM2}$$

$$F_{IM2} = 2 * F_{IM2} - F_{IM1}$$

The undesirable out-of-band spectral components IMP1 and IMP2 are generated because of third order non-linear characteristics in the power amplifier 312, which result from the amplitude of the input signal 501 exceeding the power amplifier threshold voltage V1 and also result from the multiplicative effect of the component signals WF2 and BT1 when the input signal 501 is processed by the power amplifier 312. More specifically, the Wi-Fi signal WF2 can act as a carrier for the Bluetooth signal BT1 and produce unwanted amplitude modulation of the Bluetooth signal BT1, and similarly, the Bluetooth signal BT1 can act as a carrier for the Wi-Fi signal WF2 and thus produce unwanted amplitude modulation of the Wi-Fi signal WF2. Therefore, in accordance with the present embodiments, maintaining the power amplifier 312 in the linear region during concurrent processing of Wi-Fi and Bluetooth signals is desirable to minimize data distortion and to avoid undesirable out-of-band signals (e.g., such as signals IMP1 and IMP2) that can violate FCC power limits.

Figure 6:
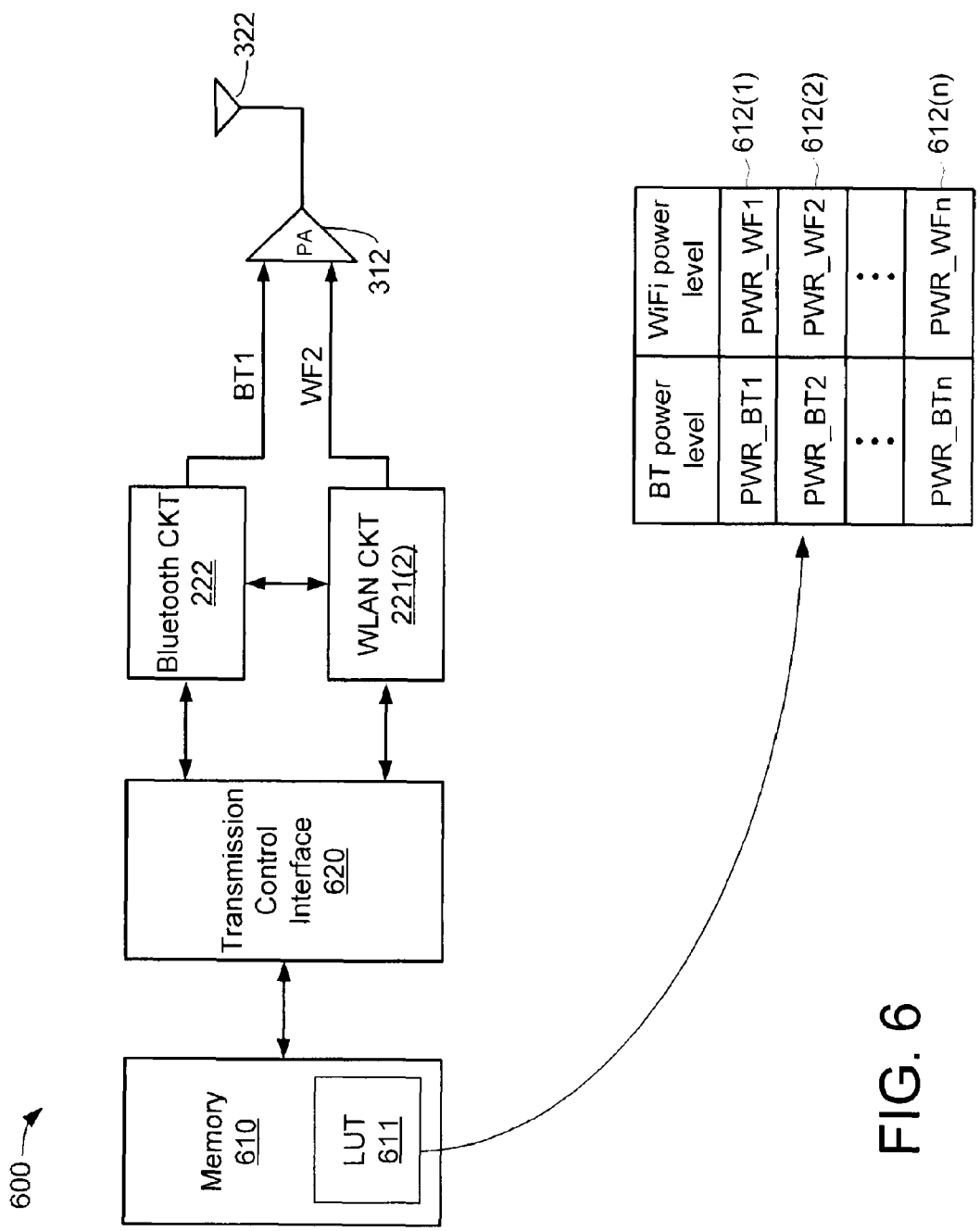
FIG. 6 is a more detailed block diagram of one embodiment of the control circuit of FIG. 3.

FIG. 6 is a block diagram of a portion of control logic 600 that is one embodiment of control logic 310 of FIG. 3. Control logic 600 is shown to include a memory 610 and a transmission control interface 620, as well as WLAN control circuit 221(2) and Bluetooth control circuit 222. The memory 610 is coupled to control interface 620, which in turn is coupled to the WLAN control circuit 221(2) and the Bluetooth control circuit 222. The WLAN control circuit 221(2) and the Bluetooth control circuit 222 are both coupled to the same power amplifier 312, which in turn is coupled to antenna 322. For simplicity, the first WLAN control circuit 221(1), the first power amplifier 311, and the first antenna 321 of wireless device 100 are not shown in FIG. 6.

For exemplary embodiments described herein, the memory 610 includes a look-up table 611 that can be implemented using well-known techniques including, for example, latches, registers, and so on. For some embodiments, the look-up table 611 can be formed using content addressable memory (CAM) cells. Each storage location 612 of look-up table 611 stores a pair of power level values PWR_BT and PWR_WF for the respective Bluetooth and Wi-Fi signals to be processed by the power amplifier 312. For example, storage location 612(1) stores a first Bluetooth power level PWR_BT1 and a corresponding Wi-Fi power level PWR_WF1, storage location 612(2) stores a second Bluetooth power level PWR_BT2 and a corresponding Wi-Fi power level PWR_WF2, and so on. More specifically, for each value of PWR_BT, which indicates the power level of a Bluetooth signal being transmitted or scheduled to be transmitted, the corresponding value of PWR_WF indicates the maximum allowable power that an associated Wi-Fi signal can be concurrently processed by the power amplifier 312 without causing the power amplifier 312 to operate in a non-linear manner. The maximum power levels embodied by the values PWR_BT and PWR_WF are based upon specified FCC out-of-band emission limits, the operating characteristics of power amplifier 312, and/or other factors such as the desired range of Wi-Fi and Bluetooth signals transmitted from the antenna 322.

The transmission control interface 620 uses the power level values stored in the look-up table 611 to selectively adjust operation of the WLAN control circuit 221(2) and/or the Bluetooth control circuit 222 to ensure that concurrent transmission of WLAN and Bluetooth signals (e.g., signals WF2 and BT1) through power amplifier 312 and antenna 322 does not generate undesirable out-of-band spectral components (e.g., signals IMP1 and IMP2 shown in FIG. 5B) that violate FCC out-of-band emission limits. The transmission control interface 620 can be implemented as hardwired logic, as software executable by a processor, or as a combination of hardware and software.

For some embodiments, the transmission control interface 620 receives from the Bluetooth control circuit 222 a message or status signal indicating whether a Bluetooth signal is currently being transmitted, information indicating the transmission power level of the Bluetooth signal, and/or scheduling information indicating if and when additional Bluetooth signals are subsequently scheduled for transmission from the wireless device. Similarly, for some embodiments, the transmission control interface 620 receives from the WLAN control circuit 221(2) a message or status signal indicating whether a Wi-Fi signal is currently being transmitted, information indicating the transmission power level of the Wi-Fi signal, and/or scheduling information indicating if and when additional Wi-Fi signals are subsequently scheduled for transmission from the wireless device. For some embodiments, the scheduling information for the WLAN control circuit 221(2) and/or the Bluetooth control circuit 222 can be stored in memory 610. For other embodiments, the scheduling information for the WLAN control circuit 221(2) and/or the Bluetooth control circuit 222 can be stored in another memory (e.g., provided within transmission control interface 620).

More specifically, when a Bluetooth signal is being transmitted or is about to be processed by the power amplifier 312, the transmission control interface 620 determines the power level of the Bluetooth signal, retrieves the corresponding maximum allowable Wi-Fi power level from the look-up table 611, and then determines whether the Wi-Fi signal can be concurrently processed by the power amplifier 312 and transmitted by the antenna 322 without creating undesirable IMP signals that violate FCC out-of-band emission limits. For some embodiments, the determined Bluetooth power level can be provided as a look-up value to look-up table 611 to retrieve the corresponding Wi-Fi transmission power limit. Similarly, when a Wi-Fi signal is being transmitted or is about to be processed by the power amplifier 312, the transmission control interface 620 determines the power level of the Wi-Fi signal, and retrieves the corresponding maximum allowable Bluetooth power level from the look-up table 611, and then determines whether the Bluetooth signal can be concurrently processed by the power amplifier 312 and transmitted by the antenna 322 without creating undesirable IMP signals that violate FCC out-of-band emission limits. For some embodiments, the determined Wi-Fi power level can be provided as a look-up value to look-up table 611 to retrieve the corresponding Bluetooth transmission power limit.

As mentioned above, the transmission control interface 620 can be configured to adjust the power level of the Wi-Fi signal to be transmitted via antenna 322 in response to the Bluetooth scheduling information and/or the power level of the associated Bluetooth signal. More specifically, for some embodiments, the transmission control interface 620 can be configured to a determine a power offset or back-off level ($PWR_{OFFSET}$) that can be used to reduce the transmission power of the Wi-Fi signal (e.g., by dynamically adjusting the gain of the power amplifier 312) to ensure that the concurrent processing of the Bluetooth signal and the Wi-Fi signal in the power amplifier 312 does not result in the generation of unwanted out-of-band spectral components that would violate the FCC out-of-band emission limits. For such embodiments, the transmission control interface 620 can determine a desired power level of the Wi-Fi signal WF2 using the Bluetooth power level and various characteristics (e.g., the transfer function, the threshold voltage, the 1 dBm compression point, the third-order intercept point, and so on) of the power amplifier 312.

For example, for a given power level of a Bluetooth signal being transmitted, if the maximum allowed power level of a concurrently transmitted Wi-Fi signal of frequency $F_{S1}$ is 15 dBm (as indicated by the value of PWR_WF retrieved from memory 610) and the gain of the power amplifier 312 at the frequency $F_{S1}$ is 8 dBm, then the desired input power of the WLAN signal can be determined as 15−8=7 dBm. Then, for an exemplary value of 10 dBm for the 1 dB compression point of the power amplifier 312, the back-off power may be calculated to be $PWR_{OFFSET}$=10−7=3 dBm.

For some embodiments, the transmission control interface 620 compares the Wi-Fi back-off level ($PWR_{OFFSET}$) with a predetermined Wi-Fi power threshold value ($THR_{WF}$) to determine whether to enable concurrent transmission of the Wi-Fi signal or to delay transmission of the Wi-Fi signal. The predetermined threshold value $THR_{WF}$ is indicative of the minimum acceptable power level of the Wi-Fi signals to be transmitted. Thus, if the Wi-Fi back-off level $PWR_{OFFSET}$ is less than the Wi-Fi power threshold value $THR_{WF}$, then the Wi-Fi signal can be transmitted at the lower power level and still have enough transmission energy to be received by an associated receiver device (not shown for simplicity). Otherwise, if $PWR_{OFFSET}$ is greater than $THR_{WF}$, the Wi-Fi signal would not have sufficient power to be properly received by the associated receiver device, and is therefore not concurrently transmitted with the Bluetooth signal.

Figure 7:
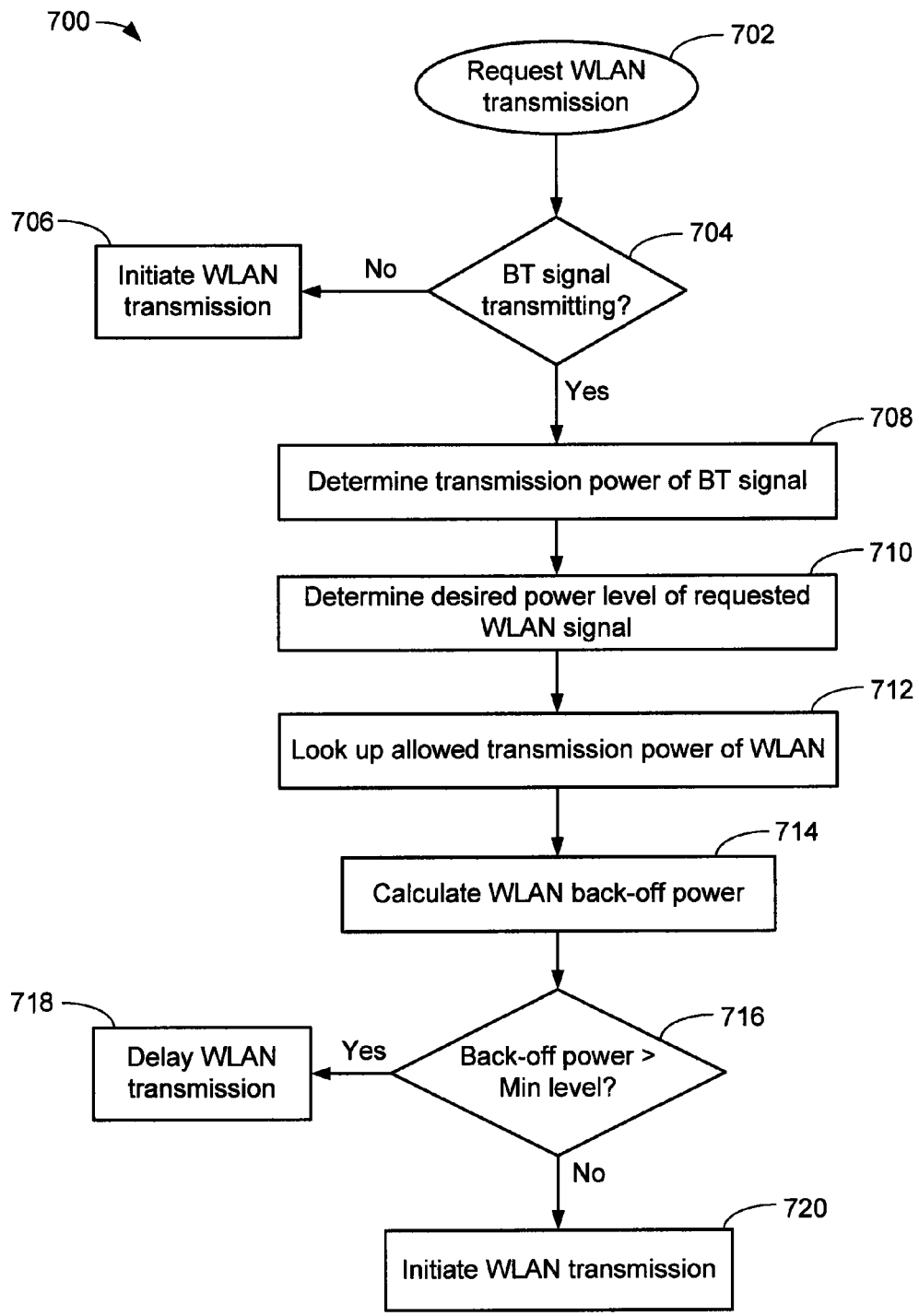
FIG. 7 is a flow chart depicting an exemplary operation of a wireless device concurrently transmitting Wi-Fi and Bluetooth signals in accordance with some embodiments.

FIG. 7 is a flow chart 700 depicting an exemplary operation of wireless device 100 when it is desired to initiate transmission of a Wi-Fi signal using the power amplifier 312 and antenna 322 shared by the WLAN control circuit 221(2) and the Bluetooth control circuit 222. First, the WLAN control circuit 221(2) requests permission from the transmission control interface 620 to initiate a WLAN transmission using the power amplifier 312 and antenna 322 (702). In response thereto, the transmission control interface 620 determines whether a Bluetooth signal is currently being transmitted by the power amplifier 312 and antenna 322 (704). If the power amplifier 312 and antenna 322 are not currently transmitting a Bluetooth signal, then the transmission of the Wi-Fi signal via the power amplifier 312 and antenna 322 is initiated and allowed to proceed (706). For some embodiments, the transmission control interface 620 sends a continue or enable signal to the WLAN control circuit 221(2) that allows the WLAN control circuit 221(2) to send the Wi-Fi signal to the power amplifier 312.

Conversely, if the power amplifier 312 and antenna 322 are currently transmitting a Bluetooth signal, as tested at 704, then the transmission control interface 620 determines the power level of the Bluetooth signal being transmitted (708). Next, the transmission control interface 620 determines the desired power level of the Wi-Fi signal requested for transmission (710), and then retrieves the corresponding maximum allowed WLAN power level from the look-up table 611 (712). For some embodiments, the WLAN control circuit 221(2) informs the transmission control interface 620 of the desired power level of the Wi-Fi signal requested for transmission. Further, the transmission control interface 620 can use the Bluetooth power level as a look-up value to access the look-up table 611, as described above.

Next, the transmission control interface 620 calculates the WLAN back-off power level $PWR_{OFFSET}$ that would reduce transmission power of the Wi-Fi signal from the desired level indicated by the WLAN control circuit to the allowed level indicated by the value of PWR_WF retrieved from the look-up table 611 (714). The WLAN back-off power level $PWR_{OFFSET}$ is then compared with the minimum WLAN power level $THR_{WF}$ (716). If the calculated WLAN back-off power level $PWR_{OFFSET}$ is greater than $THR_{WF}$, the transmission control interface 620 instructs the WLAN control 221(2) to delay the transmission of the Wi-Fi signal until completion of the Bluetooth transmission (718). Conversely, if the calculated WLAN back-off power level $PWR_{OFFSET}$ is less than or equal to $THR_{WF}$, the transmission control interface 620 instructs the WLAN control 221(2) to initiate the transmission of the Wi-Fi signal (720). More specifically, the transmission control interface 620 instructs the WLAN control circuit 221(2) to reduce the gain of the power amplifier 312 (e.g., using the calculated back-off level) when processing the Wi-Fi signal so that the transmission power of the Wi-Fi signal is less than or equal to the allowed power level indicated by the PWR_WF value retrieved from the look-up table 611. In this manner, the transmission control interface 620 ensures that concurrent transmission of a Bluetooth signal and a Wi-Fi signal using the same power amplifier 312 and antenna 322 does not result in an unacceptable level of distortion and does not generate unwanted out-of-band spectral components that violate FCC emission limits.

Note that for other embodiments, the allowed WLAN transmission power level indicated by the value of PWR_WF retrieved from the look-up table 611 can be compared with a minimum acceptable WLAN transmission power level to determine whether to delay transmission of the Wi-Fi signal (718) or to allow concurrent transmission with the Bluetooth signal (720).

Figure 8:
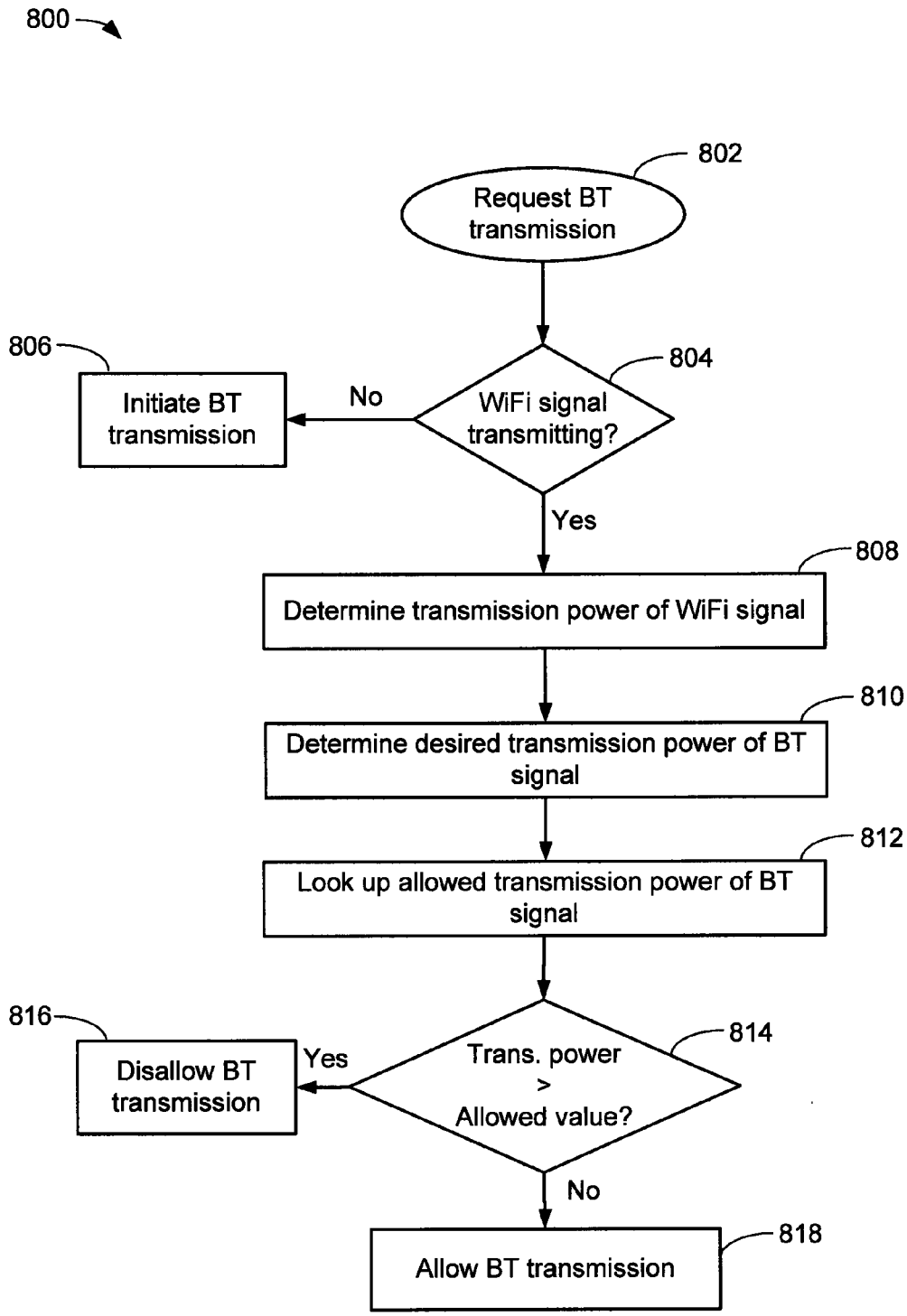
FIG. 8 is a flow chart depicting an exemplary operation of a wireless device concurrently transmitting Wi-Fi and Bluetooth signals in accordance with other embodiments.

FIG. 8 is a flow chart 800 depicting an exemplary operation of wireless device 100 when it is desired to initiate transmission of a Bluetooth signal using the power amplifier 312 and antenna 322 shared by the WLAN control circuit 221(2) and the Bluetooth control circuit 222. First, the Bluetooth control circuit 222 requests permission from the transmission control interface 620 to initiate a Bluetooth transmission using the power amplifier 312 and antenna 322 (802). In response thereto, the transmission control interface 620 determines whether a Wi-Fi signal is currently being transmitted by the power amplifier 312 and antenna 322 (804). If the power amplifier 312 and antenna 322 are not currently transmitting a Wi-Fi signal, then the transmission of the Bluetooth signal via the power amplifier 312 and antenna 322 is initiated and allowed to proceed (806). For some embodiments, the transmission control interface 620 sends a continue or enable signal to the Bluetooth control circuit 222 that allows the Bluetooth control circuit 222 to send the Bluetooth signal to the power amplifier 312.

Conversely, if the power amplifier 312 and antenna 322 are currently transmitting a Wi-Fi signal, as tested at 804, then the transmission control interface 620 determines the power level of the Wi-Fi signal being transmitted (808), and determines the desired power level of the Bluetooth signal requested for transmission (810). Next, the transmission control interface 620 retrieves the corresponding maximum allowed Bluetooth power level PWR_BT from the look-up table 611 (812). For some embodiments, the Bluetooth control circuit 222 informs the transmission control interface 620 of the desired power level of the Bluetooth signal requested for transmission. Further, the transmission control interface 620 can use the WLAN power level as a look-up value to access the look-up table 611, as described above.

Then, the transmission control interface 620 compares the expected transmission power of the requested Bluetooth signal with the maximum allowed Bluetooth transmission power PWR_BT (814). If the requested Bluetooth transmission power is greater than PWR_BT, then the transmission control interface 620 instructs the Bluetooth control circuit 222 to disallow transmission of the Bluetooth signal (816). Conversely, if the requested Bluetooth transmission power is less than or equal to PWR_BT, then the transmission control interface 620 allows the Bluetooth control circuit 222 to initiate transmission of the Bluetooth signal using the shared power amplifier 312 and antenna 322 (818). In this manner, the transmission control interface 620 ensures that concurrent transmission of a Bluetooth signal and a Wi-Fi signal using the same power amplifier 312 and antenna 322 does not result in an unacceptable level of distortion and does not generate unwanted out-of-band spectral components that violate FCC emission limits.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, for other embodiments, the WLAN control circuit 221(2) can be configured to perform the functions described above with respect to the transmission control interface 620.

What is claimed is:

1. A method for concurrently transmitting a Wi-Fi signal and a Bluetooth signal using a single power amplifier coupled to an antenna, the method comprising:
   requesting transmission of the Wi-Fi signal;
   determining an expected transmission power level of the Wi-Fi signal;
   if the Bluetooth signal is currently being transmitted, determining a transmission power level of the Bluetooth signal;
   retrieving from a look-up table a maximum allowed Wi-Fi power level associated with the determined Bluetooth transmission power level;
   comparing the maximum allowed Wi-Fi power level with the expected Wi-Fi transmission power level; and
   selectively transmitting the Wi-Fi signal concurrently with the Bluetooth signal in response to the comparing, wherein the selectively transmitting comprises:
      determining a Wi-Fi back-off power level based, at least in part, on the maximum allowed Wi-Fi power level and the expected Wi-Fi transmission power level; and
      reducing a gain of the power amplifier by the Wi-Fi back-off power level and processing the Wi-Fi signal concurrently with the Bluetooth signal in the power amplifier based, at least in part, on a comparison of the Wi-Fi back-off power level and a predetermined value.

2. The method of claim 1, further comprising:
   if the Bluetooth signal is not currently being transmitted, transmitting the Wi-Fi signal with the expected Wi-Fi transmission power level.

3. The method of claim 1, wherein the selectively transmitting comprises:
   transmitting the Wi-Fi signal if the expected Wi-Fi transmission power level is less than the maximum allowed Wi-Fi power level.

4. The method of claim 1, further comprising:
   receiving a transmission schedule for other Wi-Fi signals.

5. A method for concurrently transmitting a Wi-Fi signal and a Bluetooth signal using a single power amplifier coupled to an antenna, the method comprising:
   requesting transmission of the Wi-Fi signal;
   determining an expected transmission power level of the Wi-Fi signal;
   if the Bluetooth signal is currently being transmitted, determining a transmission power level of the Bluetooth signal;
   retrieving from a look-up table a maximum allowed Wi-Fi power level associated with the determined Bluetooth transmission power level;
   comparing the maximum allowed Wi-Fi power level with the expected Wi-Fi transmission power level; and
   selectively transmitting the Wi-Fi signal concurrently with the Bluetooth signal in response to the comparing, wherein the selectively transmitting comprises:
      determining a Wi-Fi back-off power level based, at least in part, on the maximum allowed Wi-Fi power level and the expected Wi-Fi transmission power level; and
      delaying transmission of the Wi-Fi signal based, at least in part, on a comparison of the Wi-Fi back-off power level and a predetermined value.

6. A wireless device for concurrently transmitting a Wi-Fi signal and a Bluetooth signal using a single power amplifier coupled to an antenna, comprising:
   means for requesting transmission of the Wi-Fi signal;
   means for determining an expected transmission power level of the Wi-Fi signal;
   means for determining a transmission power level of the Bluetooth signal if the Bluetooth signal is currently being transmitted;
   means for retrieving from a look-up table a maximum allowed Wi-Fi power level associated with the determined Bluetooth transmission power level;
   means for comparing the maximum allowed Wi-Fi power level with the expected Wi-Fi transmission power level; and means for selectively transmitting the Wi-Fi signal concurrently with the Bluetooth signal in response to the comparing, wherein the means for selectively transmitting is to:
   determine a Wi-Fi back-off power level based, at least in part, on the maximum allowed Wi-Fi power level and the expected Wi-Fi transmission power level; and
   reduce a gain of the power amplifier by the Wi-Fi back-off power level and processing the Wi-Fi signal concurrently with the Bluetooth signal in the power amplifier based, at least in part, on a comparison of the Wi-Fi back-off power level and a predetermined value.

7. The wireless device of claim 6, further comprising:
means for transmitting the Wi-Fi signal with the expected Wi-Fi transmission power level if the Bluetooth signal is not currently being transmitted.

8. The wireless device of claim 6, wherein the means for selectively transmitting comprises:
   means for transmitting the Wi-Fi signal if the expected Wi-Fi transmission power level is less than the maximum allowed Wi-Fi power level.

9. The wireless device of claim 6, further comprising:
   means for receiving a transmission schedule for other Wi-Fi signals.

10. A wireless device for concurrently transmitting a Wi-Fi signal and a Bluetooth signal using a single power amplifier coupled to an antenna, comprising:
   means for requesting transmission of the Wi-Fi signal;
   means for determining an expected transmission power level of the Wi-Fi signal;
   means for determining a transmission power level of the Bluetooth signal if the Bluetooth signal is currently being transmitted;
   means for retrieving from a look-up table a maximum allowed Wi-Fi power level associated with the determined Bluetooth transmission power level;
   means for comparing the maximum allowed Wi-Fi power level with the expected Wi-Fi transmission power level; and
   means for selectively transmitting the Wi-Fi signal concurrently with the Bluetooth signal in response to the comparing, wherein the means for selectively transmitting is to:
      determine a Wi-Fi back-off power level based, at least in part, on the maximum allowed Wi-Fi power level and the expected Wi-Fi transmission power level; and
      delay transmission of the Wi-Fi signal based, at least in part, on a comparison of the Wi-Fi back-off power level and a predetermined value.

11. A wireless device, comprising:
   a first control circuit for generating a Wi-Fi signal;
   a second control circuit for generating a Bluetooth signal;
   a power amplifier having an input to receive the Wi-Fi signal and the Bluetooth signal, and having an output coupled to an antenna;
   a memory having a plurality of storage locations, each for storing a maximum allowed power level of the Wi-Fi signal for a corresponding power level of the Bluetooth signal; and
   a control interface coupled to the first and second control circuits and to the memory, wherein the control interface is configured to selectively allow for concurrent transmission of the Wi-Fi signal and the Bluetooth signal via the power amplifier and antenna in response to a comparison between an expected Wi-Fi transmission power level and one of the maximum allowed Wi-Fi power levels retrieved from the memory, wherein the control interface is configured to determine a Wi-Fi back-off power level by subtracting the maximum allowed Wi-Fi power level from the expected Wi-Fi transmission power level, and wherein the control interface is further configured to reduce a gain of the power amplifier by the Wi-Fi back-off power level and to process the Wi-Fi signal concurrently with the Bluetooth signal in the power amplifier if the Wi-Fi back-off power level is less than a predetermined value.

12. The wireless device of claim 11, wherein the control interface is configured to retrieve the maximum allowed power level of the Wi-Fi signal from the memory in response to a transmission power level of a Bluetooth signal scheduled for transmission.

13. The wireless device of claim 11, wherein the control interface is further configured to allow transmission of the Wi-Fi signal with the expected Wi-Fi transmission power level if the Bluetooth signal is not scheduled for concurrent transmission.

14. The wireless device of claim 11, wherein the control interface is configured to receive a Wi-Fi signal transmission schedule from the first control circuit.

15. The wireless device of claim 14, wherein the control interface is configured to selectively transmit the Wi-Fi signals according to the Wi-Fi signal transmission schedule.

16. A wireless device, comprising:
   a first control circuit for generating a Wi-Fi signal;
   a second control circuit for generating a Bluetooth signal;
   a power amplifier having an input to receive the Wi-Fi signal and the Bluetooth signal, and having an output coupled to an antenna;
   a memory having a plurality of storage locations, each for storing a maximum allowed power level of the Wi-Fi signal for a corresponding power level of the Bluetooth signal; and
   a control interface coupled to the first and second control circuits and to the memory, wherein the control interface is configured to selectively allow for concurrent transmission of the Wi-Fi signal and the Bluetooth signal via the power amplifier and antenna in response to a comparison between an expected Wi-Fi transmission power level and one of the maximum allowed Wi-Fi power levels retrieved from the memory, wherein the control interface is configured to determine a Wi-Fi back-off power level by subtracting the maximum allowed Wi-Fi power level from the expected Wi-Fi transmission power level, and wherein the control interface is configured to delay transmission of the Wi-Fi signal if the Wi-Fi back-off power level is greater than a predetermined value.

* * * * *